United States Patent
Shelander et al.

(10) Patent No.: US 11,612,830 B2
(45) Date of Patent: Mar. 28, 2023

(54) SHORT PATH DISTILLATION HEAD

(71) Applicants: Agustus Berman Shelander, Los Angeles, CA (US); Lilibel De La Puente, Joshua Tree, CA (US)

(72) Inventors: Agustus Berman Shelander, Los Angeles, CA (US); Lilibel De La Puente, Joshua Tree, CA (US)

(*) Notice: Subject to any disclaimer, the term of this patent is extended or adjusted under 35 U.S.C. 154(b) by 0 days.

(21) Appl. No.: 17/327,711

(22) Filed: May 22, 2021

(65) Prior Publication Data
US 2022/0387904 A1 Dec. 8, 2022

Related U.S. Application Data

(60) Provisional application No. 63/029,276, filed on May 22, 2020.

(51) Int. Cl.
| | | |
|---|---|---|
| *B01D 5/00* | (2006.01) | |
| *B01D 3/32* | (2006.01) | |
| *B01L 3/00* | (2006.01) | |
| *B01D 3/02* | (2006.01) | |

(52) U.S. Cl.
CPC ............. *B01D 5/0066* (2013.01); *B01D 3/32* (2013.01); *B01D 5/006* (2013.01); *B01L 3/56* (2013.01); *B01L 3/569* (2013.01); *B01D 3/02* (2013.01)

(58) Field of Classification Search
CPC ... B01D 3/02; B01D 3/12; B01D 3/32; B01D 5/006; B01D 5/0063; B01D 5/0066; B01L 3/56; B01L 3/561; B01L 3/563; B01L 3/569
See application file for complete search history.

(56) References Cited

U.S. PATENT DOCUMENTS

| | | | |
|---|---|---|---|
| 3,340,157 A | | 9/1967 | Weiss |
| 3,907,683 A | * | 9/1975 | Gilmont .................... B01B 1/08 202/180 |
| 4,187,903 A | * | 2/1980 | Judson ................ B01D 5/0012 165/104.32 |
| 10,279,281 B2 | | 4/2019 | Kremerman |
| 10,406,451 B2 | * | 9/2019 | Maibach .................. B01D 3/16 |
| 10,493,374 B2 | | 12/2019 | Wells et al. |
| 10,569,191 B2 | | 2/2020 | Kremerman |
| 10,661,197 B1 | | 5/2020 | Kremerman |
| 10,751,638 B2 | * | 8/2020 | Maibach, Jr. ........ B01D 5/0087 |
| 10,874,955 B2 | | 12/2020 | Kremerman |
| 10,946,303 B2 | | 3/2021 | Kremerman |
| 10,967,292 B1 | | 4/2021 | Kremerman |

(Continued)

OTHER PUBLICATIONS

"Your Guide to Corrosion-Resistant Metals", Corrosionpedia, Oct. 18, 2018, URL: https://www.corrosionpedia.com/your-guide-to-corrosion-resistant-metals/2/6811.*

*Primary Examiner* — Jonathan Luke Pilcher
(74) *Attorney, Agent, or Firm* — Intellectual Property Venture Group; Raymond E. Roberts (57) ABSTRACT

A distillation head for distilling a distillate from a vaporous distilland. The distillation head including a headspace chamber within a condenser surface. An inlet port having an extended portion below and to but not into the headspace, to receive the vaporous distilland and pass it into the headspace. A collection surface below the headspace to collect the distillate. And an outlet port, to receive the distillate from the collection surface and pass it out of the distillation head.

9 Claims, 7 Drawing Sheets

(56) References Cited

U.S. PATENT DOCUMENTS

| | | |
|---|---|---|
| 10,987,607 B2 | 4/2021 | Kremerman |
| 11,338,217 B1 | 5/2022 | Kremerman |
| 2019/0009188 A1 | 1/2019 | Kremerman |
| 2019/0321747 A1 | 10/2019 | Kremerman |
| 2019/0321750 A1 | 10/2019 | Kremerman |
| 2020/0338468 A1 | 10/2020 | Kremerman |
| 2020/0406161 A1 | 12/2020 | Kremerman |
| 2021/0001244 A1 | 1/2021 | Kremerman |

* cited by examiner

SHORT PATH DISTILLATION HEAD

CROSS-REFERENCE TO RELATED APPLICATIONS

This application claims the benefit of U.S. Provisional Application No. 63/029,276, filed 22 May 2020, hereby incorporated by reference in its entirety.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

COPYRIGHT NOTICE AND PERMISSION

This document contains some material which is subject to copyright protection. The copyright owner has no objection to the reproduction with proper attribution of authorship and ownership and without alteration by anyone of this material as it appears in the files or records of the Patent and Trademark Office, but otherwise reserves all rights whatsoever.

BACKGROUND OF THE INVENTION

Technical Field

The present invention relates generally to distillation and, more specifically, to distillation equipment with a fraction collector.

Background Art

Distillation or fractional distillation is carried out by heating a solid or liquid and removing gaseous vapors that are expelled therefrom. This can be done while raising the temperature, as each compound boils at a different temperature.

Distillation heads are common pieces of laboratory equipment, traditionally made of glass and acting as the vapor connection between a boiling flask and a condenser. The condenser is always located after a change in direction that allows the vapor to into the head and then turn so a condensed liquid can flow onward to be collected. The space where the vapor path changes direction allows a chance for the vapor to condense and fall backward or reflux into the boiling flask.

Figure 1A:
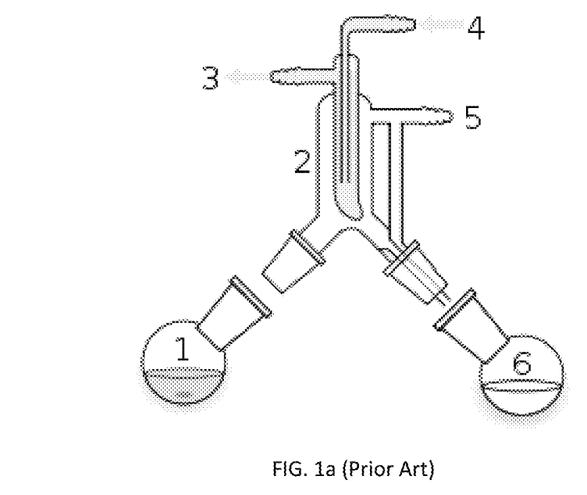
FIGS. 1a (Prior Art) and 1b (Prior Art) are schematic diagrams of an essentially same shot-path distillation approach, wherein FIG. 1a (Prior Art) is taken from "SHORT-PATH DISTILLATION—WIKIPEDIA"
Figure 1B:
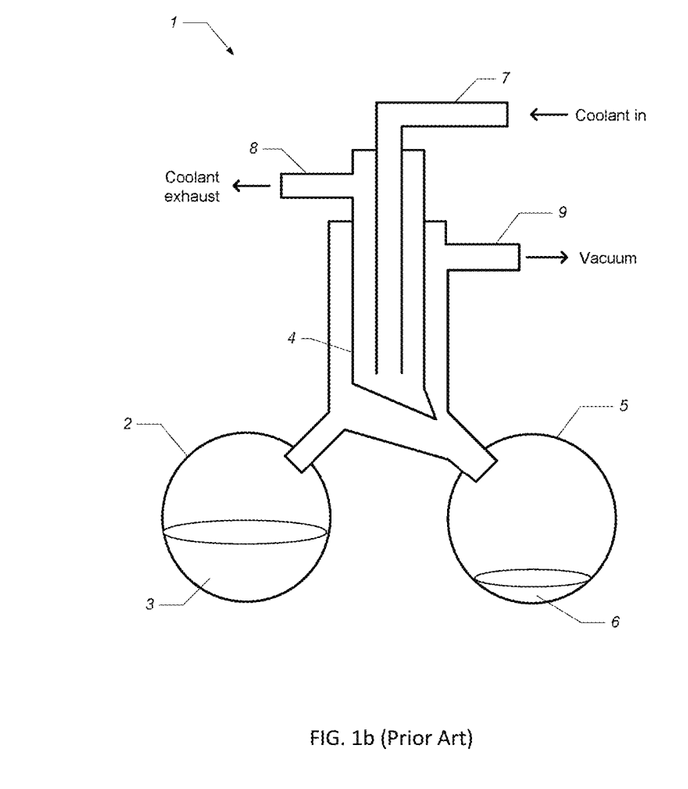

FIGS. 1a (Prior Art) and 1b (Prior Art) are schematic diagrams of a shot-path distillation approach. As can be seen, these are of essentially the same approach.

FIG. 1a (Prior Art) is taken from SHORT-PATH DISTILLATION—WIKIPEDIA, (en.wikipedia.org/wiki/Short-path_distillation), as of Apr. 14, 2021. Paraphrasing the original text and elaborating for clarity, here a "short-path vacuum distillation apparatus" appears (hereinafter the "distillation apparatus"). A still pot (1) (e.g., a boiling flask) contains a distilland, and connects to the distillation apparatus as shown. The distillation apparatus includes a vertical condenser (2) (aka, a cold finger) that has a cooling water out port (3) and a cooling water in port (4). The vertical condenser (2) includes a vacuum/gas port (5). In particular, the vertical condenser (2) includes a bottom, rightward displaced portion (not identified by a reference in the original; the bottom tip of the cold finger is crocked or points slightly rightward). This feature allows for condensate/distillate from the distillation apparatus to fall towards and collect in a distillate flask (6). Concurrently, any remaining vapor (i.e., non-distillate) in the distillation apparatus is drawn out via the vacuum/gas port (5) (the original document labels this a "5: Vacuum/gas inlet" [SIC].)

FIG. 1B (Prior Art) is FIG. 1 (Prior Art) from U.S. Pat. No. 10,493,374 for a SHORT-PATH DISTILLATION APPARATUS AND METHOD by Wells, et al., which issued Dec. 3, 2019. Here a short-path distillation apparatus (1) appears. A still pot (2) (e.g., a boiling flask) is provided that contains a distilland (3). Vapor from the still pot (2) enters into short-path distillation apparatus (1), which includes a cold finger (4) (i.e., a condenser; here also one that is vertical). A collection flask (5) is provided to collect a distillate (6) from the short-path distillation apparatus (1). The cold finger (4) includes a "Coolant in" inlet (7) and a "Coolant exhaust" outlet (8). In particular, and like the approach discussed above, the cold finger (4) here also includes a bottom, rightward displaced portion (not identified by a reference in the original; and here as well it can also be said that the bottom tip of the cold finger is crocked or points slightly rightward). This similarly allows for the distillate (6) here to fall towards and collect in the collection flask (5). Concurrently, any remaining vapor (i.e., non-distillate) is drawn out by "Vacuum" at a vacuum port (9).

Figure 1C:
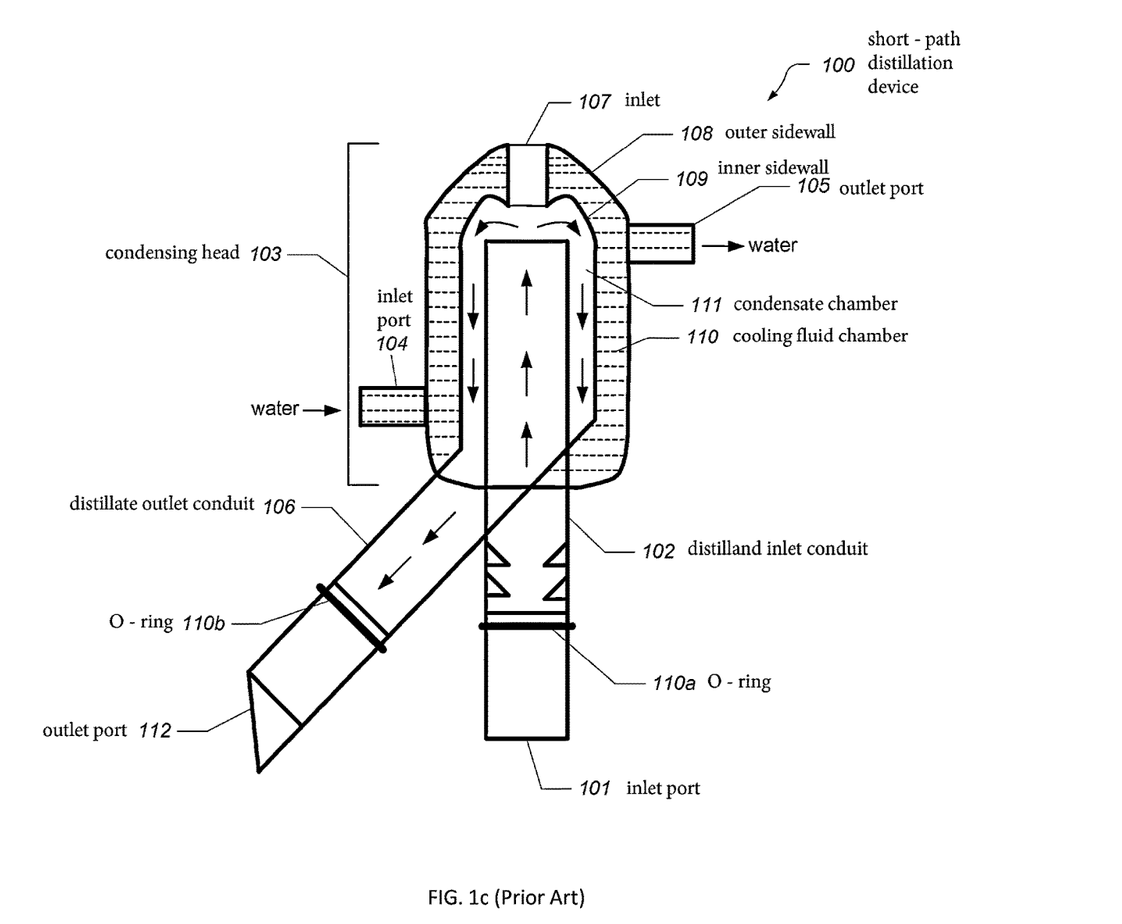
FIG. 1c (Prior Art) is FIG. 2 also from U.S. Pat. No. 10,493,374 by Wells, et al.

FIG. 1c (Prior Art) is FIG. 2 from U.S. Pat. No. 10,493,374 for a SHORT-PATH DISTILLATION APPARATUS AND METHOD by Wells, et al., which issued Dec. 3, 2019. This is of a short-path distillation device (100) according to a first embodiment of Wells' disclosure. [Reference numbers from the original are retained here with labels taken from the original text added here.] This figure does not show a still pot or boiling flask, a distilland, a collection flask, or a distillate but it can be seen that this embodiment conceptually follow the approaches depicted in FIGS. 1a-b (prior art).

Salient points here are that these distillation apparatuses minimize the distillation path, and hence the label "short-path vacuum distillation" is used for this approach and apparatuses using it are distinguishable from other distillation approaches.

In the distillation arts, when working with small amounts of starting raw material or items which have close boiling points, distillation can be difficult, as multiple compounds get removed simultaneously. Further, a problem can arise when the temperature throughout the distillation equipment is not constant, and some of the vapor re-condenses before being evacuated from a distillation chamber.

Granted, prior art approaches generally, and those discussed above specifically, have addressed these problems somewhat, there remains the need to distill with greater efficiency and separation of compounds, while preventing vapors from re-condensing back into the product being distilled.

[U.S. Pat. No. 10,493,374 for a SHORT-PATH DISTILLATION APPARATUS AND METHOD by Wells, et al. will be discussed briefly further, and U.S. Pat. No. 10,279,281 for a BULBOUS FRACTIONAL COLLECTOR IN DISTIL- LATION HEAD by Kremerman will also be discussed briefly, once the present invention has been disclosed, below.]

BRIEF SUMMARY OF THE INVENTION

Accordingly, it is an object of the present invention to provide apparatus and methods to improve the state of the art by moving and shortening the vapor path and thus minimizing undesired reflux in distillation.

Briefly, one preferred embodiment of the present invention is a distillation head for distilling a distillate from a vaporous distilland. Included is a headspace chamber within a condenser surface. Further included is an inlet port having an extended portion extending below and to but not into the headspace chamber, to receive the vaporous distilland and to pass it into the headspace chamber. Further included is a collection surface below the headspace chamber to collect the distillate. Further included is an outlet port, to receive the distillate from the collection surface and to pass it out of the distillation head.

Briefly, another preferred embodiment of the present invention is a process for distilling a distillate from a vaporous distilland. Included is directing the vaporous distilland into a distillation head via an inlet port. Further included is receiving the vaporous distilland via an extended portion of the inlet port into a headspace of the distillation head, where the extended portion of the inlet port extends below and to but not into the headspace and where the headspace is at least partially encompassed by a condensing surface. Further included is condensing portions of the vaporous distilland onto the condensing surface such that it falls as distillate onward to a collecting surface. Further included is collecting the distillate that falls onto the collecting surface. Further included is receiving the distillate collected into an outlet port. And further included is directing the distillate received out of the distillation head.

These and other objects and advantages of the present invention will become clear to those skilled in the art in view of the description of the best presently known mode of carrying out the invention and the industrial applicability of the preferred embodiment as described herein and as illustrated in the figures of the drawings.

BRIEF DESCRIPTION OF THE SEVERAL VIEWS OF THE DRAWING(S)

The purposes and advantages of the present invention will be apparent from the following detailed description in conjunction with the appended figures of drawings in which:

FIG. 1b (Prior Art) is FIG. 1 (Prior Art) from U.S. Pat. No. 10,493, 374 by Wells, et al.

In the various figures of the drawings which are prior art (i.e., FIGS. 1a-c), references are included from the originals.

DETAILED DESCRIPTION OF THE INVENTION

A preferred embodiment of the present invention is a short path distillation head. As illustrated in the various drawings herein, and particularly in the view(s) of FIGS. 2a-b, an embodiment of the invention is depicted by the general reference character (10).

Figure 2A:
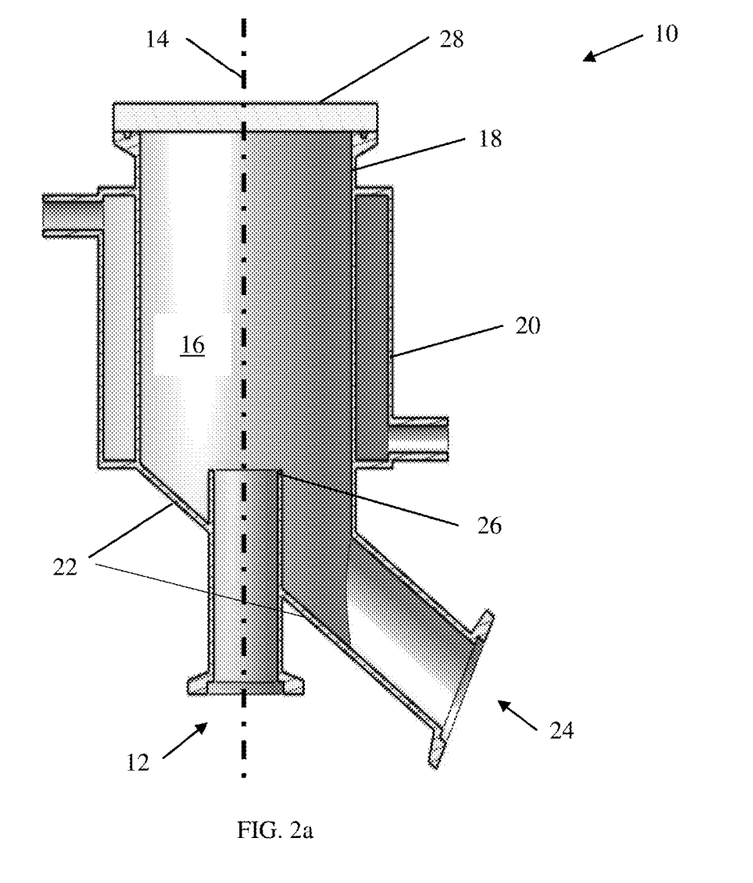
FIG. 2a is a schematic side cut away view of a first embodiment of a short path distillation head in accord with the present invention.

FIG. 2a is a schematic side cut away view of a first embodiment of a short path distillation head 10 in accord with the present invention. A vaporous distilland in a distillation process enters the distillation head 10 via an inlet port 12 (e.g., a "vapor tube") from a lower boiling flask (not shown; the boiling flask may be conventional in the existing distillation arts). As depicted here, the distillation head 10 and many elements of it can be largely symmetrical about a common axis 14.

Figure 2B:
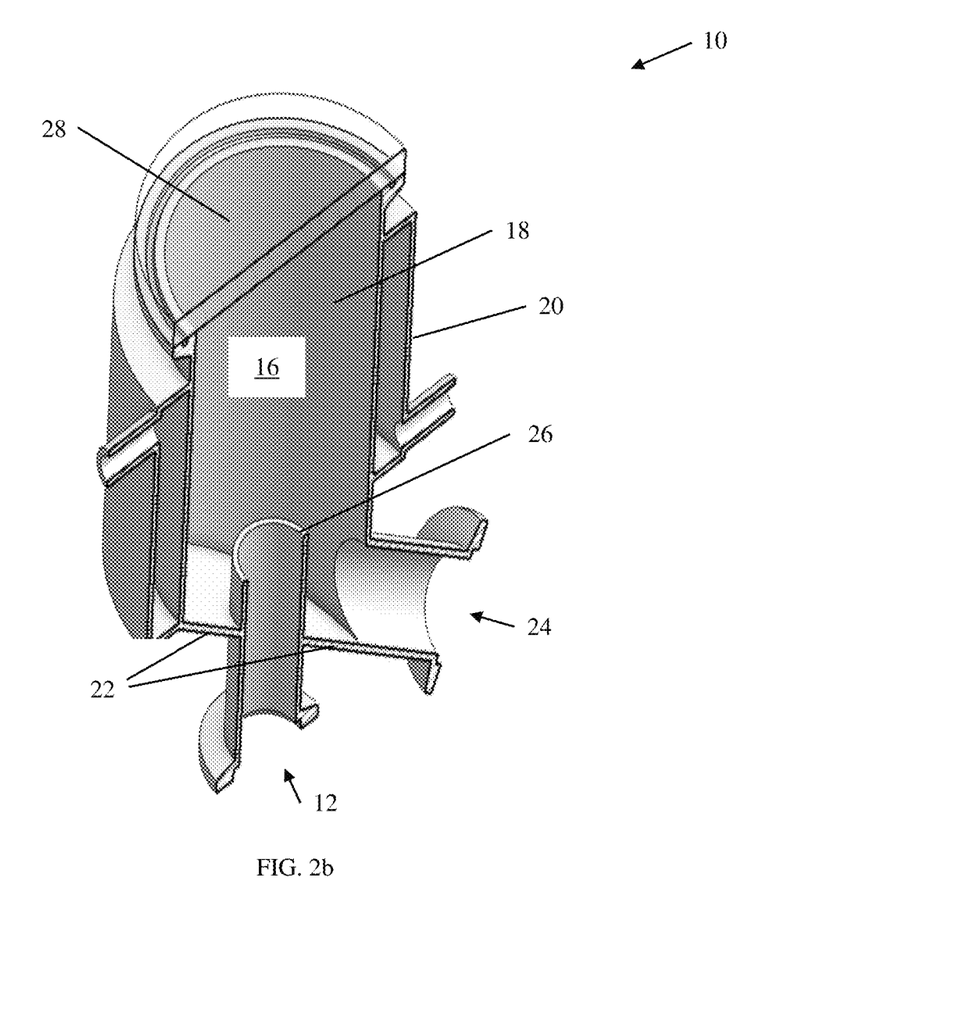
FIG. 2b is a schematic perspective cut away view of the same distillation head.

The entering vaporous distilland expands into a headspace 16 (i.e., the interior of or a chamber in the distillation head 10) it comes into contact with a condenser surface 18 where at least one component of the vapor is commenced to a distillate in liquid state. The condenser surface 18 is held at a desired temperature by a cooler 20 (e.g., a liquid jacket to receive a cooling medium as depicted in FIG. 2a-b) The distillate then flows down the condenser surface 18 and onto a collection surface 22 which is angled toward an outlet port 24. Concurrently, an extended portion 26 above the inlet port 12 prevents any of the distillate from flowing back into the boiling flask. The outlet port 24 may be angled (as shown) to help the liquid distillate flow and may also be of a large enough diameter to allow uncondensed gasses to escape. An optional sight portal 28 (e.g., a "sight glass") can be provided to allow the process to be observed. FIG. 2b is a schematic perspective cut away view of the same distillation head 10 in FIG. 2a.

Figure 3:
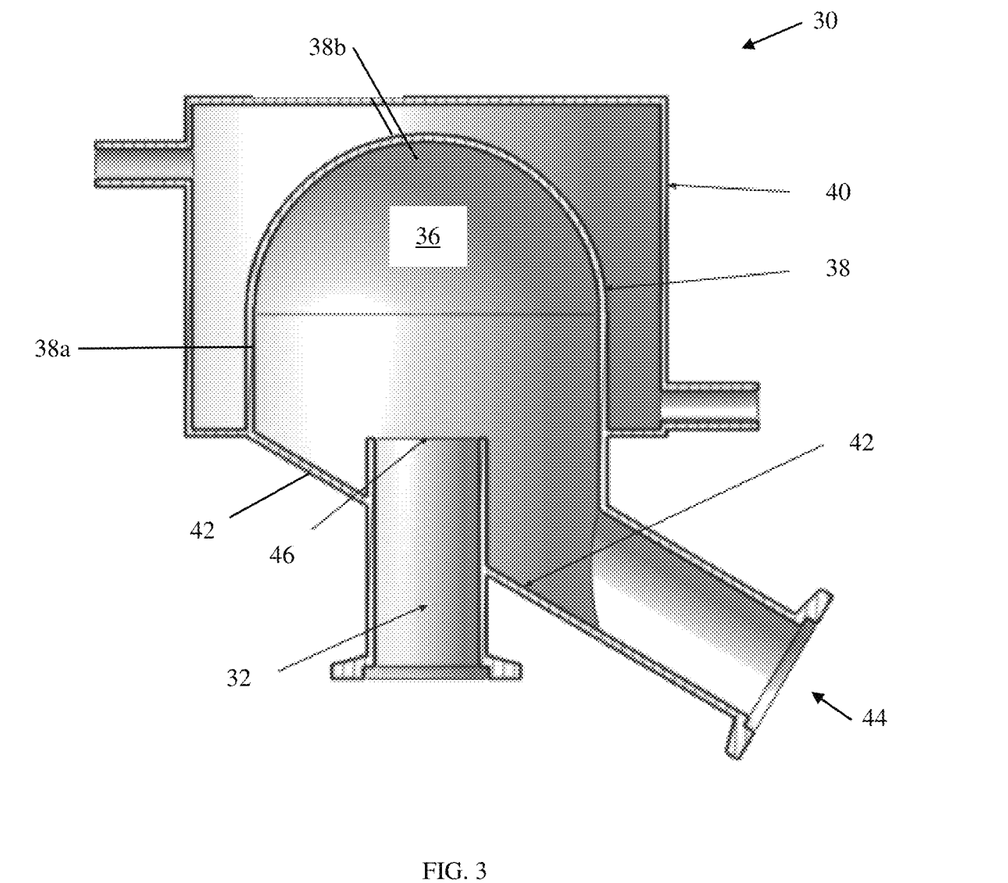
FIG. 3 is a schematic side cut away view of a second distillation head embodiment in accord with the present invention.

FIG. 3 is a schematic side cut away view of a second embodiment in accord with the present invention, here of a distillation head 30. A vaporous distilland in a distillation process here enters the distillation head 30 via an inlet port 32 by flowing up from a lower boiling flask (not shown). As the vapor expands into a headspace 36 it comes into contact with a condenser surface 38 where some of the components of the vapor are commenced to a distillate in liquid state. The condenser surface 38 here is held at a desired temperature by flowing a coolant through a cooler 40. The distillate then flows down the condenser surface 38 and onto a collection surface 42 which here is angled toward an outlet port 44. Concurrently, an extended portion 46 above the inlet port 32 prevents the distillate from flowing back into the boiling flask. The outlet port 44 is here also angled to help liquid flow and is of a large enough diameter to allow uncondensed gasses to escape. In contrast with the embodiment depicted in FIGS. 2a-b, an optional sight portal is not provided in the embodiment depicted in FIG. 3.

Returning to the condenser surface 38, it is intentionally here depicted having a tubular lower portion 38a and a hemispherical upper portion 38b.

Figure 4:
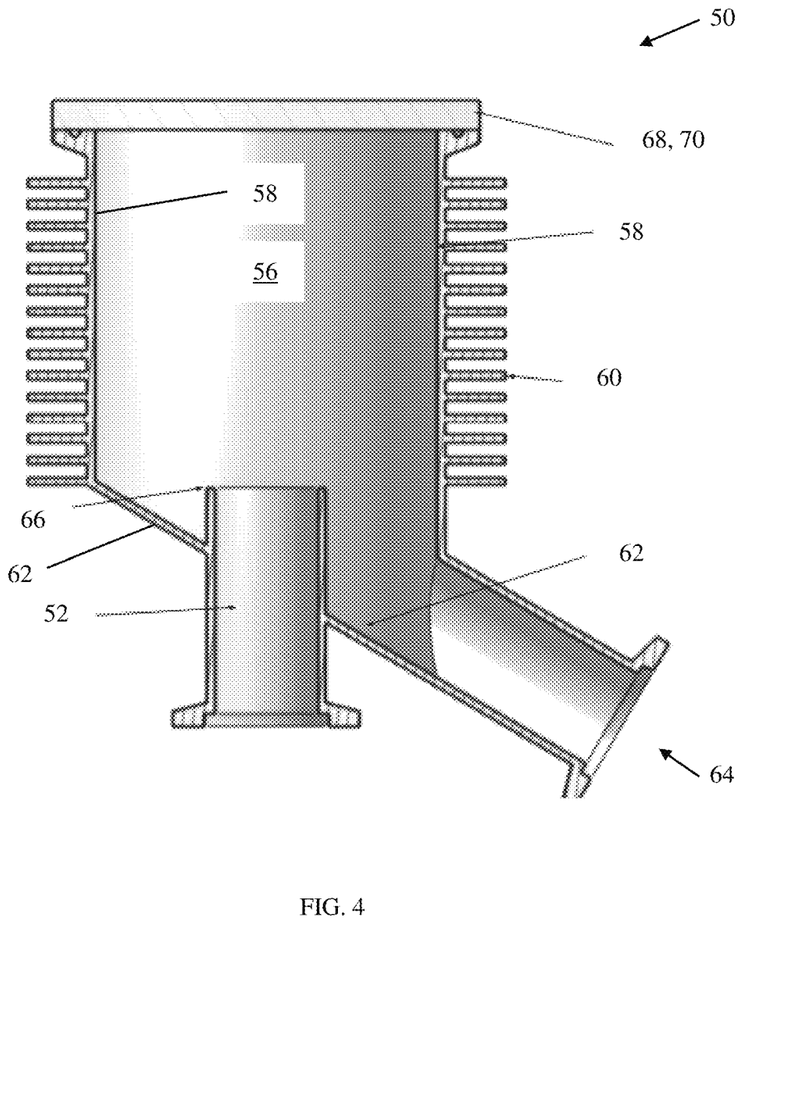
FIG. 4 is a schematic side cut away view of a third distillation head embodiment in accord with the present invention.

FIG. 4 is a schematic side cut away view of a third embodiment in accord with the present invention, here of a distillation head 50. A vaporous distilland in a distillation process here enters the distillation head 50 via an inlet port 52 by flowing up from a lower boiling flask (not shown). As the vapor expands into a headspace 56 it comes into contact with a condenser surface 58 where some of the components of the vapor are commenced to a distillate in liquid state. The condenser surface 58 here has an attached cooler 60 (here including a fin or fins) to hold the condenser surface 58 at a temperature in a desired range. The distillate then flows down the condenser surface 58 and onto a collection surface 62 which here is angled toward an outlet port 64. Concurrently, an extended portion 66 above the inlet port 52 prevents the distillate from flowing back into the boiling flask. The outlet port 64 is here also angled to help liquid flow and is of a large enough diameter to allow uncondensed gasses to escape. Similar to the embodiment depicted in FIGS. 2a-b, and in contrast with the embodiment depicted in FIG. 3, an optional sight portal 68 is provided in the embodiment depicted in FIG. 4. Additionally, a removable element 70 can be provided above the headspace 56, to provide access to it, and this removable element 70 may be or include the optional sight portal 68 as is the case depicted in FIG. 4.

Figure 5:
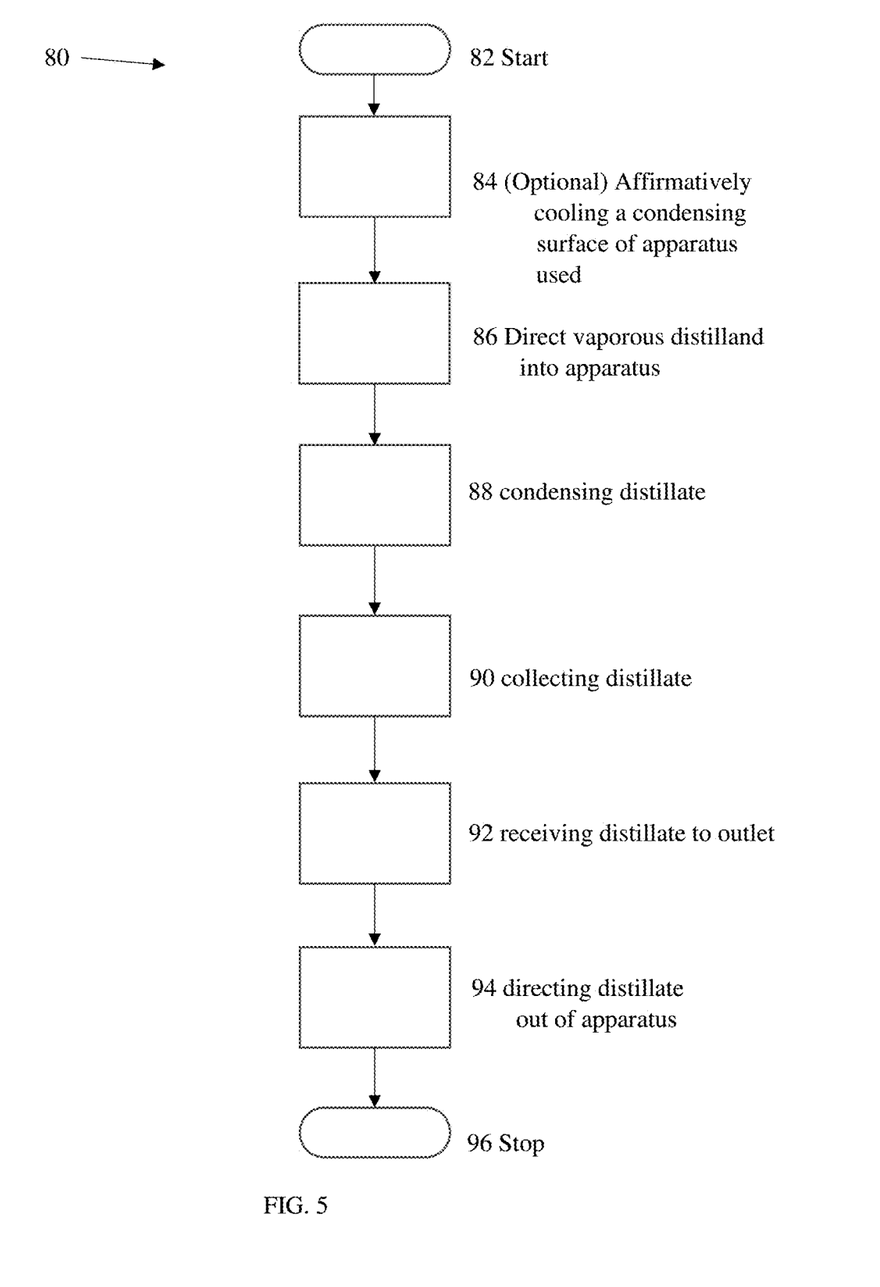
FIG. 5 is a flow chart depicting a process in accord with the present invention.

FIG. 5 is a flow chart depicting a process 80 in accord with the present invention. In a step 82 the process 80 starts. In an optional step 84 a condensing surface of a distillation apparatus is cooled. In a step 86 a vaporous distilland is directed into the distillation apparatus. In a step 88 a distillate is condensed out of the vaporous distilland. In a step 90 that distillate is collected. In a step 92 this distillate is received into an outlet from the distillation apparatus. In a step 94 the final distillate is directed out of the distillation apparatus. And in a step 96 the process 80 stops.

We return now briefly to some of the prior art. U.S. Pat. No. 10,493,374 by Wells, et al. was previously introduced. It can now be appreciated that distilland inlet conduit (102) extends into its condensate chamber (111), thus considerably lengthening its distillation path. In contrast, in the present invention the extended portion 28, 46, 66 of the inlet port 12, 32, 52 ends at or below the headspace 16, 36, 56 within the condenser surface 18, 38, 58, thus permitting the present invention to comport with the primary defining goal of "short path" distillation.

U.S. Pat. No. 10,279,281 by Kremerman was also previously noted. It has a "fraction collector" that directs fluid to a side port where its condenser is located. In contrast the inventive distillation head 10, 30, 50 disclosed herein has its condenser surface 18, 38, 58 generally coaxial with respect to and located above its outlet port 24, 44, 64.

While multiple embodiments have been described above, it should be understood that these have been presented by way of examples only, and that the breadth and scope of the present invention should not be limited by the above described exemplary embodiments but should instead be defined only in accordance with the following claims and their equivalents.

What is claimed is:

1. A distillation head (10, 30, 50) for distilling a distillate from a vaporous distilland, comprising:
    a headspace chamber (16, 36, 56) at least partially encompassed by an actively cooled condenser surface (18, 38, 58);
    an inlet port (12, 32, 52) having an extended portion (26, 36, 56) below and to but not into a volume encompassed by said actively cooled condenser surface, said inlet port configured to receive the vaporous distilland and pass it into said headspace chamber;
    a collection surface (22, 42, 62) below said headspace chamber to collect the distillate, wherein said collection surface has a planar sloped lower surface and said headspace chamber and said condenser surface have a vertical common first axis, said extended portion of said inlet port has a vertical second axis, and said first axis and said second axis are coaxial;
    a separable upper surface (28, 68, 70) above said headspace chamber wherein said separable upper surface encompasses an entire upper-most surface area of said headspace chamber with no inward restriction from said condensation surface; and
    an outlet port (24, 44, 64), to receive the distillate from said collection surface and pass it out of the distillation head.

2. The distillation head (10, 30, 50) of claim 1, wherein the condenser surface (18, 38, 58) is of a corrosion resistant metal alloy.

3. The distillation head (10, 30, 50) of claim 1, further comprising a cooler (20, 40, 60) attached to said condenser surface (18, 38, 58).

4. The distillation head (10, 30, 50) of claim 3, wherein said cooler (20, 40, 60) receives a flowing medium to cool said condenser surface (18, 38, 58) and thereby also to cool portions of the distilland that contact said condenser surface (18, 38, 58).

5. The distillation head (10, 30, 50) of claim 4, wherein said medium is a member of the set consisting of a liquid and a gas.

6. The distillation head (10, 30, 50) of claim 3, wherein said cooler (60) includes at least one fin (60) attached to said condenser surface (18, 38, 58).

7. The distillation head (10, 30, 50) of claim 1, further comprising a sight portal (28, 68) above said headspace chamber (16, 36, 56).

8. A process for distilling a distillate from a vaporous distilland, the process comprising the steps of:
    (a) directing the vaporous distilland into a distillation head via an inlet port;
    (b) receiving the vaporous distilland via an extended portion of said inlet port into a headspace chamber of said distillation head, wherein:
        (1) said headspace chamber is at least partially encompassed by a condensing surface that is actively cooled and has a separable upper surface, wherein said separable upper surface encompasses an entire upper-most surface area of said headspace chamber with no inward restriction from said condensation surface; and
        (2) said extended portion of said inlet port extends below and to but not into a volume encompassed by said condenser surface that is actively cooled;
    (c) condensing portions of the vaporous distilland onto said condensing surface such that it falls as distillate onward to a collecting surface, wherein said collection surface has a planar sloped lower surface;
    (d) collecting the distillate that falls onto said collecting surface;
    (e) receiving the distillate collected in (c) into an outlet port; and
    (f) directing the distillate received in (d) out of said distillation head.

9. The process of claim 8, wherein said condensing surface is actively cooled by a flowing medium that is a member of the set consisting of a liquid and a gas.

* * * * *